Patented Apr. 4, 1944

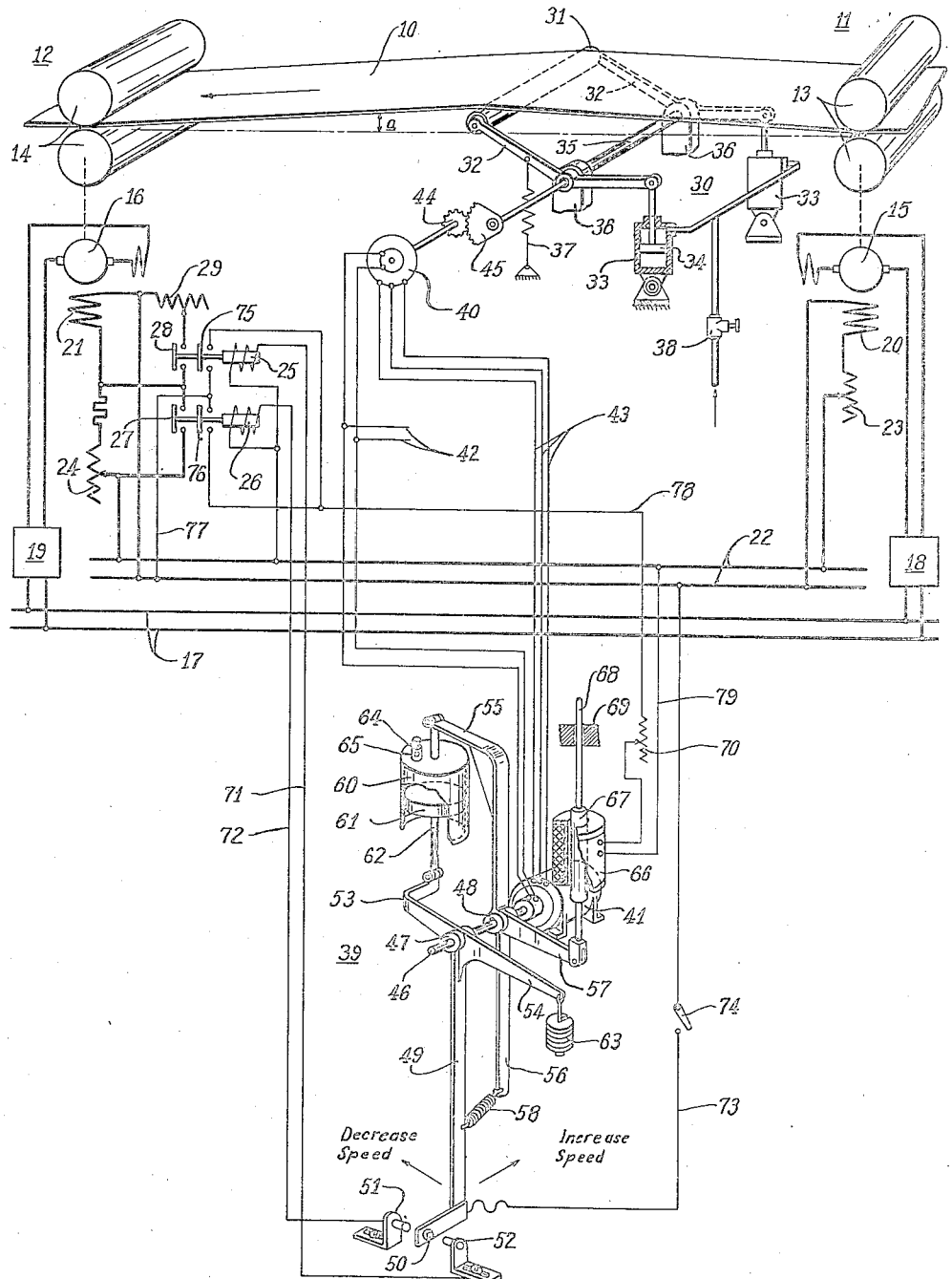

2,345,765

UNITED STATES PATENT OFFICE 2,345,765

TENSION CONTROLLING APPARATUS

Mathias Michel, Pittsburgh, Pa., assignor to Aluminum Company of America, Pittsburgh, Pa., a corporation of Pennsylvania Application April 13, 1942, Serial No. 438,686

13 Claims. (Cl. 80—35)

This invention relates in general to control apparatus for electric motor drives and more particularly to tension responsive regulator mechanism for controlling the speed of motors driving, for instance, the roll stands of a tandem or continuous rolling mill for automatically maintaining a predetermined tension on the strip material during rolling thereof; but the invention as a whole, as well as various parts or features thereof, is also suitable for use in various other relations.

In the cold rolling of strip metal in a tandem rolling mill, the prevailing practice is to maintain tension in the strip undergoing reduction. This tension is recognized as being an extremely important factor in the reduction and the quality of the strip and is required to be accurately controlled. In some cases, the strip is tensioned by the action of a pressure roller which is movable to deflect the strip out of the normal straight pass line, and sometimes is so mounted and arranged on a lever system as to be somewhat self-compensating, within a limited range, for variations in its effectiveness as the angle of deflection varies. The movement of such a roller is also used to actuate control devices of various types which are intended to vary the speed of one of the driving motors whenever any change occurs and increase or decrease the length of the strip between two roll stands so as to return strip tension to its initial value. However, the tension is likely to vary suddenly so that speed regulating mechanism or systems are complicated by the need for effecting speed correction, over an extended range, quickly to take up slack and relieve excess tension quickly, and also by the need for effecting permanent changes in speed of the controlled motor.

In prior control systems, the operating characteristics thereof frequently cause an excessive change in motor speed to occur first in one direction and then in the other direction, which changes result in varying tension values. The variations are usually due to the common fault in prior regulator action, namely, that the control contacts thereof remain operative to vary the motor speed so long as the pressure roller is out of its normal position, and the regulator action also is sometimes not fast enough to control the magnitude of the speed change being made, especially when the roller movement toward normal position takes place rapidly. Since the action of the regulator follows the roller movement, the regulator of the prior art cannot anticipate return of the roller to normal position and the control contacts remain closed too long with a consequent overchange in speed of the controlled motor and the roll stand or other strip pulling device driven thereby.

It is an object of the present invention, therefore, to provide an improved control system for a strip tensioning device operative to effect momentary or temporary speed change in a controlled motor in response to change in the position of the tensioning device from a normal position to bring about such change in speed as to take up slack or release excessive tension quickly. Another object is to provide such a regulator which is further operative to effect temporary speed change proportional to the amount of positional change of the tensioning device, which determines the length of time the tensioning device is out of normal position. Another object is to provide a speed regulating system wherein small permanent speed corrections are effected as a result of the regulator operation, which permanent speed corrections are proportional to the temporary speed changes.

A further object is the provision of a simple and reliable regulator mechanism having a floating or loosely mounted control member and means for actuating the same in synchronism with a strip tensioning device to effect speed change, together with means operable to return the control member to its normal position in opposition to the actuating means. A further object is the provision of an improved tension responsive regulator mechanism which is extremely sensitive, stable, and accurate in operation, and which is capable of returning tension in a moving strip of material quickly to a normal value whenever any change occurs. Other objects and advantages of the invention will appear on consideration of the detailed description, in which a particular embodiment of the invention has been selected for purposes of illustration, taken in conjunction with the accompanying drawing, wherein the single figure is a schematic or diagrammatic view of the tension responsive control apparatus or system.

In carrying the invention into effect in the rolling of strip metal in a tandem rolling mill where it is desired to maintain tension on the strip substantially constant, the strip between two adjacent roll stands is placed under a predetermined tension by deflecting it from the normal straight pass line by a deflecting or pressure roller which is operatively connected to a power cylinder that is supplied with fluid pressure from a suitable constant pressure source.

The driving motor of one of the roll stands is arranged to be automatically controlled in accordance with variations in the position of the pressure roller so as to increase or decrease the speed thereof and the mill rolls driven thereby, and thus to control the strip tension by lengthening or shortening the portion of the strip between the two roll stands. The motor control includes a regulator device having a motive system that is responsive to positional changes of the pressure or tensioning roller, and means are provided to oppose the motive system as a momentary change in speed of the controlled motor is being made in order to bring the regulator to non-regulating position prior to the time it would be returned if it followed the return movement of the tensioning roller exactly. Means operable in response to movement of the tensioning roller toward its normal position at a rapid rate as a result of changing motor speed are provided to stop further speed change immediately instead of waiting for normal regulator action, whereby excessive change in motor speed will be prevented. As will hereinafter be described, if the momentary speed change thus effected is not sufficient to cause the roller to return fully to its normal position, the regulator is allowed to operate again to produce additional speed changes. In this manner, over and under speed changes and overrunning of the normal position for the tensioning roller are greatly minimized.

Referring now to the drawing, strip metal 10 is adapted to be reduced in rolling mill stands 11 and 12, which may have any desired roll arrangement; as here shown, mill 11 has a pair of reducing rolls 13 and mill 12 has a pair of reducing rolls 14. The rolls 13 and 14 are driven by means of suitable direct current electric motors 15 and 16, respectively, the shaft of each of the motors being connected to the respective rolls by any suitable means in a well known manner such, for example, as through reducing gearing (not shown). As indicated by the arrow, the strip 10 passes from the roll stand 11 to the roll stand 12 and is reduced or worked upon simultaneously at both roll stands as it is passing therethrough.

The motors 15 and 16 are preferably shunt or compound wound motors, the armatures of which are supplied with direct current power from a suitable source illustrated as power lines 17, suitable controllers 18 and 19 being provided in the circuits of the respective motors whereby the motors may be started and stopped. Various methods of controlling the motors to change the speed thereof may be utilized. As here shown, field control is employed. The motors are provided with separately excited shunt field windings 20 and 21, respectively, which may be energized by a suitable source of excitation here illustrated as supply lines 22. An adjustable resistance 23 is provided in the shunt field circuit of the motor 15, while an adjustable resistance 24 is provided in the shunt field circuit of the motor 16. By adjusting these two resistances, the speeds of the respective motors and the mill rolls driven thereby may be initially set to any desired rolling schedule, the second roll stand 12, of course, being operated at a higher speed than the first roll stand 11 in order to accommodate elongation of the strip as it is reduced in gauge at the first stand.

In addition to the manual control of the motors by adjustment of the resistances 23 and 24, provision is made to automatically control the speed of the motor 16 in accordance with the strip tension, but the motor 15 could be selected for automatic control instead, if desired. As here shown, automatic field control of the motor 16 is effected by the operation of shunting relays or switches 25 and 26, which in turn are controlled by regulator mechanism to be hereinafter described.

When the operating coil of the relay 26 is energized, contacts 27 thereof are closed to complete a shunt circuit around the series resistance 24, thus establishing a higher field strength due to the lowered resistance in the field circuit so that the motor speed immediately begins to decrease. When the coil of the relay 25 is energized, contacts 28 thereof are closed to complete a circuit containing an adjustable resistor 29 in parallel with the shunt field 21, thus establishing a higher voltage drop external to the shunt field circuit which reduces the shunt field strength so that the motor speed immediately begins to increase. Instead of using direct field control to control motor speed as shown, the controlled motor may be excited from a pilot exciter, and the shunting relays 25 and 26 may act upon the field of the pilot exciter in order to bring about changes in motor speed in a manner well known in the art. The use of a controlled booster generator for controlling the motor speed is also contemplated. It may be pointed out that the speed changes capable of being effected by prolonged operation of the switch 25 or the switch 26 is about 10 per cent to 20 per cent of the speed range of the motor, and is thus far in excess of the needed speed change to correct for the greatest variation in tension which is likely to occur. If the relays are allowed to remain closed appreciably long, the motor speed changes the full amount. However, the relays are so controlled by the regulator mechanism as to effect but momentary changes in speed and of reduced magnitude, and if these changes are not sufficient to cause the tension in the strip to return to normal amount, additional momentary changes in speed will be effected in a manner hereinafter described.

A predetermined tension is applied to the strip between the mill rolls by a tensioning device indicated generally by the numeral 30. This device may take various forms, but as here shown it comprises an idler roller 31 mounted on the upper ends of bell crank levers 32, and power cylinders 33, whose pistons 34 are connected to the other ends of the levers 32. The levers are secured to a shaft 35 that is suitably journalled in bearings 36 so that the pistons 34 may be utilized to rock the bell crank levers and the shaft 35 and move the roller 31 upwardly against the underside of the strip 10, the cylinders 33 being pivotally supported as shown to accommodate rocking movement of the levers. The roller 31 is somewhat wider than the width of the widest strip that can be accommodated by the mill rolls 13 and 14, and its axis is parallel to the axes of the mill rolls. It is disposed to engage the strip at a point substantially midway between the two roll stands.

A spring 37 is connected to one of the bell crank arms in order to move the roller 31 downwardly into idle position below the pass line of the mill when fluid pressure is permitted to exhaust from the cylinders 33. The roller is brought into this position whenever there is no strip in the mill or at those times while it is being passed or threaded from the first roll stand 11 to the succeeding roll stand 12. Fluid pressure from a suitable constant pressure source (not shown) is utilized to actuate the pistons 34, a suitable valve 38 being provided to control flow of the pressure fluid into and out of the cylinders 33.

It will be appreciated that with the strip engaged between the rolls of both roll stands and with the driving motors 15 and 16 operating at their preselected speeds, the valve 38 may be actuated to admit fluid pressure into the cylinders 34, whereby the bell crank levers are rocked in a direction to move the roller 31 upwardly to engage the strip and deflect the same from its straight pass line, as shown in broken lines, into a deflected position, as shown by the full lines. The roller 31 comes to rest in a normal strip tensioning position with the strip deflected about 2 or 3 inches above the straight pass line. The strip is thus placed under tension, the tension value being a function of the upward pressure exerted by the roller 31 and the sine of the angle of deflection $a$. It follows that the strip tension will remain constant and the roller 31 will remain in its normal strip deflecting position so long as the applied pressure and the deflection angle remain the same. It will be understood, of course, that the desired amount of tension can be initially set up in the strip by supplying fluid from the constant pressure source under the required pressure.

It will be seen that as the rolling operation proceeds with the strip under tension that any displacement of the tensioning roller from its normal position is an indication of tension variation usually due to elongation or shortening of the length of strip between the two roll stands. If the length of strip increases, the roller 31 will move upwardly with the tension decreasing because the angle of deflection becomes greater. Conversely, if the length of strip decreases, the roller will move downwardly under the increased tension in the strip. The increase in tension is liable to be severe enough to cause the strip to break, particularly in cases where the strip is subjected initially to high unit tension values, while loss of tension is to be avoided because of the effects thereof in the reduction of the strip.

In order to return strip tension to normal value quickly, regulator mechanism responsive to the positional changes of the roller 31 is provided to automatically control the speed of the motor 16 so as to increase or decrease the length of strip between the two roll stands. The regulator mechanism is indicated generally by the numeral 39 and is actuated from the tensioning device 30 through the medium of an electrical motion transmitting and receiving system of a type well known in the art. The system includes a transmitter 40 and a receiver 41, each having a rotor and a stator, the rotors being energized from a suitable source of alternating current, such as is indicated by the supply lines 42, and the stators being interconnected with each other through conductors 43. Upon rotation of the transmitter rotor relative to its stator, electric energy will flow in conductors 43 and tend to cause the receiver rotor to rotate in synchronism in the same direction and through the same number of degrees relative to its stator. The magnitude of the induced current flowing between the transmitter 40 and the receiver 41 is proportional to any angular displacement between the respective rotors. This current will set up a torque between the rotor and the stator of the receiver 41, which will cause the rotor of the receiver to rotate and generally follow the movements of the transmitter rotor, as is well understood in the operation of electrical tie devices of this kind. In electrical tie devices, however, relative angular displacement one from the other can be externally produced, as will appear.

A pinion 44 is secured to the rotor shaft of the transmitter 40 and it meshes with a gear segment 45 that is secured to the shaft 35. The rotor of the receiver 41 is provided with a shaft 46. It will thus be seen that the shaft 46, through the operation of the electrical tie devices 40 and 41, will be caused to follow the movements of the shaft 35 of the tensioning device 30. Since the angular movement of the shaft 35 is quite small even for the maximum range of travel of the tensioning roller 31, it is preferred to use a gear ratio between the pinion 44 and the gear segment 45 which will amplify the angular movement of the rotor of the transmitter 40 so that likewise the angular movement of the shaft 46 will be increased. For the full range of movement of the tensioning roller 31, such a gear ratio may be used as will give approximately 90° of transmitter rotor movement.

A floating control or contact member 47 and an operating member 48 are mounted on the shaft 46, the floating member being loosely supported on the shaft and the member 48 being suitably fixed to the shaft to turn therewith. Both members may take various forms, and in the form shown each comprises a lever having three arms radiating from a central hub. The arm 49 of the floating member 47 normally hangs in a vertical depending position and is provided at its lower end with contact points 50 for cooperating with stationary electrical contacts 51 and 52, while its other two arms 53 and 54 extend horizontally from the hub. The arms 55 and 56 of the fixed member 48 extend in opposite directions from the hub thereof, and the third arm 57 extends laterally therefrom. Due to the fact that the rotor of the receiver 41 and its shaft 46 take an angular position corresponding to the angular position of the rotor of the transmitter 40 which in turn is determined by the position of the tensioning roller 31, the member 48 is initially secured to shaft 46 in such a position that when the roller 31 is moved into its normal strip tensioning position as shown, the fixed member 48 will be so rotated as to bring the floating member 47 into a mid position relative to the contacts 51 and 52. Hence, any movements of the roller 31 from its normal tensioning position will be transmitted to the shaft 46 and the fixed member 48 swung in one direction or the other with respect to the floating control member 47. Such movements of the fixed member are transmitted to the floating control member by means of a yieldable operating connection, which may suitably be a tension spring 58 which is connected to the arms 49 and 56, the spring 58 being sufficiently tensioned to prevent fluttering of the control member when the arms 49 and 56 are in parallel relation.

Upon a change in tension to a degree requiring speed correction to bring the tension back to normal, the resultant movement of the roller 31 will be transmitted to the shaft 46, and it turns in a clockwise or a counterclockwise direction depending upon the direction of movement of the roller, and serves to pull the arm 49 of the floating member 47 in the same direction and effect engagement of the contact 50 with one of the stationary contacts 51 and 52. Any rotation of the shaft 46 which will move the arm 56 beyond the arm 49 when motion of the arm 49 is arrested through engagement of its contact 50 with either of the stationary contacts 51—52 will result in the spring 58 being tensioned to an extent proportional to the angular displacement between the floating member 47 and the operating member 48, the extent of such displacement being dependent upon the amount of displacement or positional change of the roller 31 from its normal position. So long as the arm 56 of the fixed member 48 is in a position beyond the stopped or circuit closing position of the control member 47, electrical forces will be operative to effect change in motor speed in a manner hereinafter described.

Ordinarily the roller 31 may oscillate slightly from normal position without causing the regulator member 48 to move far enough to effect operation of the relays 25 or 26, as the case may be. The contacts 51 and 52 are adjustably mounted, as shown, so that the spacing thereof relative to the normal mid position of the movable contact 50 may be adjusted as desired. The movement permitted the control member 47 without engaging either contact 51 or 52 is determined by the spacing of contacts 51 and 52 relative to the mid position of the movable contact. By adjustment of contact spacing, sensitivity of the regulator action may be controlled within limits.

An inverted air-dash pot 60 is pivotally secured to the outer end of the arm 55 and is provided with a piston 61 having a piston rod 62 which is pivotally connected to the outer end of the arm 53. Weights 63 are hung from the arm 54 to counterbalance the piston 61, the floating arm 47 being carefully balanced so that it will not swing until compelled to do so by movement of the operating member 48. The piston is normally centrally positioned in the dash pot, and air flow into and out of the dash pot is controlled by an adjustable air valve 64 which may suitably be of the needle type controlling flow through an orifice 65. The dash pot provides a variable tie between the two members 47—48 that is yielding under relatively slow movement of the member 48, but is substantially rigid under rapid movement thereof.

Means are provided to apply a counteracting force to the member 48 to oppose the operating torque that moves the member in a circuit closing direction, in order to move the member 48 in a counter or a circuit opening direction. This means suitably comprises an electromagnet having a coil 66 and a plunger 67 movable therethrough, the lower end of the plunger being pivotally connected to the arm 57, and its upper end having a guide rod 68 which passes through a suitable support or guide 69. Normally with the fixed member 48 in neutral position, the core 67 in an axial direction is centered in the coil 66 and is moved in either direction relative to the coil by movement of the fixed member 48.

When the coil 66 is energized with the plunger 67 out of centered position, the power of the electromagnet which may be controlled by adjustment of a rheostat 70, opposes the torque of the receiver 41 and moves the fixed member 48 toward its normal or neutral position. The opposing forces are so related that for a small displacement of the tensioning roller 31 out of its normal position, the force of the electromagnet is capable of immediately overcoming the torque of the receiver 41 completely so as to move the member 48 in a circuit opening direction beyond the member 47 in its closed circuit position and effect opening of the contacts 50—51 or 50—52 as the case may be. For a greater displacement of the roller 31, the power of the electromagnet is insufficient to move the member 48 back far enough to effect opening of the closed regulator contacts, the counteracting force of the electromagnet serving to move the member 48 against the torque of the receiver 41, which thus becomes increasingly greater, into a position of reduced angular displacement relative to the floating contact member 47 with respect to the amount of displacement that would normally be effected between the members 47 and 48 under the influence of the torque of the receiver 41 alone. In other words, the member 48 is given a leading or an advanced angular relationship with respect to the tensioning roller 31, whereby earlier contact opening is effected as the motor speed changes and the roller moves toward normal position.

For slow movement of the tensioning roller 31 toward normal position, the effect of this advanced angular relation for the operating member 48 is sufficient to cause opening of the regulator contacts in time to limit the momentary and permanent speed change of the motor, thereby preventing overtravel of the roller 31. In this way, the return movement of roller 31 to normal position is anticipated and the motor speed changing circuits cut off before excessive speed change is made. This, however, is true only for a given speed of approach for the roller 31 to normal position, since if roller 31 travels toward its normal position at a greater rate of speed by reason of a speed change having been made through action of the regulator, the contacts of the regulator will not be opened soon enough to stop the action of the speed changing circuits in time to prevent the roller 31 overrunning its normal position. In this instance, the above mentioned variable device 60 becomes operative as a rigid connection between the operating member 48 and the floating contact member 47 to positively move the floating member 47 in a direction to open the regulator contacts in response to the rapid movement of the roller 31, thereby rendering the speed changing circuits inoperative. The valve 64, of course, may be adjusted to control the rate of flow of air past the valve so that this action of the regulator may be effected at a desired rate of travel for the roller 31. It will be observed that air flows past the valve 64 whenever relative movement between the members 47 and 48 occurs, the movement of the member 47 being limited by the contacts 51 and 52.

The operating coils of the shunting relays 25 and 26 are connected to one side of the power line 22, and through conductors 71 and 72 are connected to the stationary contacts 52 and 51, respectively. The movable regulator contact 50 is connected through conductor 73 and manually operable switch 74 to the other side of the power line 22. The switch 74 is closed only when automatic speed control by the regulator 39 is desired. The shunting relays 25 and 26 are also provided with auxiliary contacts 75 and 76, each of which is operative to control energization of the electromagnet 66, the energizing circuit extending from one side of the power line 22 through conductor 77 and contacts 75 or 76 in parallel through conductors 78, rheostat 70, coil 66, and to the other side of the line. Hence, it will be seen that each time one of the relays 25 or 26 is energized to effect change in motor speed, the electromagnet 66 also will be energized so as to effect opening of the regulator contacts after an interval dependent upon the relative strength of the opposing forces.

With the above understanding of the apparatus and the manner in which the various elements are associated and connected to each other in the system, the operation thereof will become more readily understood in the light of the following brief description of the mode of operation.

Assuming that the respective roll stands are running a the proper speeds and with the strip 10 entered between both pairs of rolls 13 and 14, the operator may actuate valve 38 to admit fluid pressure to the cylinders 33, thereby moving the roller 31 into its normal strip tensioning position. If for any reason a loss in tension, for example, occurs, the roller 31 moves upwardly, and the consequent clockwise angular movement of the shaft 35 is translated into angular movement of the shaft 46 through the electrical tie 40—41. In this case, the shaft 46 is moved in a counterclockwise direction whereby contacts 50 and 52 are closed and the relay 25 is energized. By closure of the relay contacts 28, the excitation of the shunt field circuit is reduced by a large amount and the motor 16 immediately begins to accelerate to impose a greater pulling force on the strip 10 and shorten the length thereof to restore normal tension in the strip and move the roller 31 down to its normal tensioning position. At the same time, by closure of the contacts 75, the electromagnet 66 is excited and opposes the operating torque holding the contacts 50—52 closed. Depending upon the extent of displacement of the roller 31, the increase in speed needed to restore normal tension conditions may not be very great, and the torque developed by the receiver 41 may not be sufficient to hold the contacts 50—52 closed against the pull of the electromagnet 66. The electromagnet, therefore, becomes effective to open the circuit of the switch 25 by moving the contact 50 away from the contact 52, thereby cancelling the change in the motor field excitation and also opening the circuit of the electromagnet 66, thus limiting the magnitude of speed change. If the speed correction has not been sufficient to return the tension conditions to normal, the roller 31 will, of course, still be out of its normal strip tensioning position so that the fixed member 48 will again be swung in a counterclockwise direction to reclose the contacts 50 and 52. In this way, motor acceleration conditions are repeated and such action occurs until the roller 31 is returned to its normal position with normal tension values imposed on the strip. Thus, each time the regulator operates to close the motor accelerating circuit, the circuit is not permitted to remain closed long enough to allow the motor to change its speed the full amount possible under the amount of field strength decrease afforded by the amount of resistance inserted into the external field circuit. Only a momentary percentage speed change is permitted to occur and these are repeated as described until the necessary speed change has been effected.

Assuming that the loss in tension is great enough to allow the roller 31 to move near its uppermost position, thus necessitating a greater speed change, a greater torque will be developed by the receiver 41 and a greater angular displacement between the members 47 and 48 will be effected, so that the magnetic pull of the electromagnet 66 will not be sufficient immediately to overcome the torque and open the contacts 50—52, but will move the member 48 in a counter direction into a leading angular relation therefor as above described. Hence, the motor accelerating circuit will remain closed for a greater length of time, thus permitting a greater change in the field flux. As the speed increases, the excessive length of strip will be taken up and the roller 31 depressed toward its normal position. When it reaches a point where the pull of the magnet overpowers the decreasing torque, the contacts 50—52 will be opened. From this point, any additional change in motor speed to bring the tension value and the roller position to normal will take place as above described for small changes in the position of the tensioning device.

In case the tension in the strip should increase, depending upon the extent of such increase and the depression of the roller 31, the same regulator action as above described takes place with the exception that the relay 26 will be operated instead of the relay 25. In this case, the control resistance 24 is shunted out, and due to the increase in field strength, the motor begins to decelerate. Under control of the regulator, the deceleration control circuit becomes energized and de-energized until the tension value in the strip and the position of the roller 31 are returned to normal.

Each time either of the speed changing circuits is rendered operative by action of the relays 25 or 26, maximum voltage change in the motor field is effected and the amount of speed change produced thereby is controlled by varying the periods of time the actuated speed changing circuit is allowed to remain operative, dependent upon the extent of displacement of the tensioning roller from its normal position. Normally the roller, as a result of changing speed, is moved relatively slowly toward its normal position, in which case the operating connection between the members 47 and 48 functions to open the closed regulator contacts soon enough to prevent the change in motor speed from becoming excessive. In this case, the normal action of the regulator is unaffected by the variable tie device 60, the air merely flowing past valve 64. It sometimes happens, however, that the roller 31 moves suddenly to an extreme position and the changing motor speed is effective to cause rapid movement of the roller 31 toward its normal position, which is an indication that sufficient speed change has been made and that the motor should not be allowed to further change its speed even though the roller is not returned fully to normal position. At this time, the dash pot 60 operates as a rigid tie between the members 47 and 48 because of the build-up of air pressure between the relatively moving piston and cylinder and positively moves the contact 50 of the floating member 47 away from the contact 51 or 52 so that the motor speed changing circuit is immediately cut off independently of the angular position of the member 48 relative to the contact member 47. Since the roller 31 is not fully returned to normal position, the speed changing circuit is thus rendered inoperative independently of the position of the roller.

Moreover, whenever the regulator operates to effect a change in motor speed, due to the fact that the hysteresis of the magnetic circuit of the controlled motor does not permit the flux to return to its initial value after a temporary change in m. m. f. has been made, a slight permanent change in the motor speed results therefrom even though the excitation value is brought back to that value which existed before the regulator went into operation. With a temporary increase in m. m. f., the motor will have a higher permanent flux thereafter, while with a temporary decrease in m. m. f., the motor will have a lower permanent flux value thereafter. In both cases, the flux deviation from the original value depends upon the amount of change impressed upon the magnetic circuit. Hence, for the varied periods of time that the regulator contacts are closed, maximum voltage changes are effected in the field circuit so that the field flux is permitted to build up or decay to a different value, and after secession of the regulator action, a higher or lower permanent change in speed is produced. The motor is operated at its new speed until another speed change is effected by regulator action.

From the foregoing, it will be seen that the motor accelerating and decelerating circuits are operated selectively under control of the regulator which in turn is responsive to positional changes of the tensioning devices and that the percentage change in motor speed is determined by the varied time periods that the regulator contacts are closed as determined by the extent of the change in position of the tensioning member. Since the change in motor speed is effective to return the roller 31 toward its normal operating position, such change should not be so great as to cause overtravel of the roller. By the provision of the opposed actuating devices 41 and 66 for the operating member 48, overchange in motor speed is prevented by allowing the regulator contacts to remain closed for a period determined by the relative strengths of the opposing forces, as heretofore described. This closure period thus limits and determines the actual magnitude of the speed change which will be effected with respect to the full amount of change which can be made by operation of the relays 25 and 26, if either of them is left closed long enough. Hence, as the motor speed increases or decreases, as the case may be, return of the roller to its normal operating position is anticipated and the regulator action is stopped sooner than otherwise would be the case if the opposing device 66 for the member 48 were not provided.

The provision of the variable tie 60 is also an important feature of the invention, since it functions to positively open the regulator contacts independently of the means which normally operate to open the regulator contacts whenever rapid movement of the tensioning roller 31 toward normal position takes place, as heretofore described.

While a preferred embodiment of the invention is herein illustrated and described in connection with a tandem strip rolling mill, it is apparent that the control system is susceptible of a wide variety of uses and that various changes in the construction and operation of the parts may be made without departing from the spirit of the invention or the scope of the appended claims.

What is claimed is:

1. In a control system for apparatus having a plurality of devices arranged in tandem for operating on a strip of material, in combination, separate driving motors for said devices, means for initially presetting the speeds of said motors relative to each other, a tensioning device having a roller engaging the strip and movable from a normal operating position in response to changes in strip tension, means operable to increase the speed of one of said motors to increase strip tension, means operable to decrease the speed of said one motor to decrease strip tension, electrically actuated switches controlling the operation of said speed increasing means and said speed decreasing means, respectively, a control member movable in opposite directions from a normal position for selectively controlling the operation of said switches, an operating member yieldably connected to said control member for actuating the same, electrical means operatively connected to said tensioning device and to said operating member for transmitting the movements of said roller from its normal position to said operating member and correspondingly actuate the latter, whereby said control member is moved in the same direction and one of said control switches is energized, to effect a change in motor speed and cause the tensioning roller to return to normal position, and electromagnetic means actuated by the operation of either of said control switches for moving said operating member in opposition to the operating force applied thereto by said electrical means, to effect return of said control member to its normal position.

2. A control system as defined in claim 1, which system is characterized by the inclusion of a rotatable gear connection between said tensioning device and said electrical means, which gear connection is operative to increase the movements imparted to said electrical means from said tensioning device by a predetermined amount.

3. A control system as defined in claim 1, which system is characterized by the provision of a variable tie between said operating member and said control member, said tie comprising an airdash pot connected to one member, a piston connected to the other member, and an adjustable valve controlling flow into and out of the dash pot.

4. In a tandem rolling mill or the like having a plurality of roll stands for operating on a strip of material and a driving motor for each roll stand, control mechanism therefor comprising means for initially adjusting the speeds of said motors to establish a predetermined speed relation between them, a tensioning device disposed between adjacent roll stands and comprising a roller movable transversely of the normal pass line for the strip, means for moving the roller into engagement with the strip under a predetermined substantially constant force to deflect and tension the strip, an electrical motion transmitting means comprising a transmitter and a receiver, said transmitter having a rotatable element operatively connected to said tensioning device for angular displacement in accordance with the movements of said roller from normal position, said receiver having a rotor, a shaft connected to said rotor, an operating member secured to said shaft, a control member loosely mounted on said shaft, spring means connecting said operating member to said control member, a pair of fixed contacts mounted in position to be engaged by said control member through movements thereof in opposite directions, said control member normally being disposed out of contact with said contacts, a pair of control relays electrically connected to said stationary contacts, respectively, for selective operation by the operation of said control member, means controlled by operation of one of said relays to effect increase in motor speed, means controlled by operation of the other relay to effect decrease in motor speed, electromagnetic means operatively connected to said operating member for moving the same in opposition to the torque applied thereto by said rotor, and means actuated by the operation of either of said relays for energizing said electromagnetic means, to effect movement of said control member out of contact with one of said stationary contacts.

5. Control mechanism for a variable speed motor driving apparatus operating on a strip of material simultaneously at a plurality of spaced points comprising, in combination, a movable tensioning element bearing against the portion of the strip extending between said spaced points with a predetermined force to deflect and tension the same, said element being movable from a normal tensioning position in response to variations in length of said portion of the strip, speed changing means for the motor, including a pair of selectively actuated control switches, and operable to effect a temporary change in motor speed by an amount dependent upon the length of time one of said switches is actuated, means for actuating one of said switches independently of the other switch in response to movement of said tensioning element from its normal position, dependent upon the direction of movement of said tensioning element, and meas responsive to actuation of either of said switches and cooperating with said switch actuating means to render the same inactive only when said tensioning element is being moved toward said normal position, thereby to limit the period of time said actuated switch initially remains actuated.

6. Control mechanism for a variable speed motor driving apparatus operating on a strip of material simultaneously at a plurality of spaced points comprising, in combination, a movable tensioning element bearing against the portion of the strip extending between said spaced points with a predetermined force to deflect and tension the same, said element being movable from a normal tensioning position in response to variations in length of said portion of the strip, speed changing means for the motor, including a pair of control switches, and operable to effect a temporary change in motor speed by an amount dependent upon the length of time either of said switches is actuated, means for actuating one of said switches independently of the other switch in response to movement of said tensioning element from its normal position, dependent upon the direction of movement of said tensioning element, and means responsive to the rate of movement of said tensioning element toward its normal position under the changing motor speed and cooperating with said switch actuating means, for rendering said one switch inoperative immediately independently of the position of said tensioning element.

7. Control mechanism for a variable speed motor driving apparatus operating on a strip of material simultaneously at a plurality of spaced points comprising, in combination, a movable tensioning element bearing against the portion of the strip extending between said spaced points with a predetermined force to deflect and tension the same, said element being movable from a normal tensioning position in response to variations in length of said portion of the strip, speed changing means for the motor, including a pair of control switches, and operable to effect a temporary change in motor speed by an amount dependent upon the length of time either of said switches is actuated, a control member movable from a neutral position in opposite directions to actuate said switches selectively, means for actuating said control member in response to movement of said tensioning element with a variable operating force and in a direction determined by the extent and direction of movement of the tensioning element, to actuate one of said switches, and means responsive to the actuation of either of said switches for applying a counteracting force to said control member to move the same toward its neutral position to a point determined by the intensity of the variable operating force.

8. Control mechanism for a variable speed motor driving apparatus operating on a strip of material simultaneously at a plurality of spaced points comprising, in combination, a movable tensioning element bearing against the portion of the strip extending between said spaced points with a predetermined force to deflect and tension the same, said element being movable from a normal tensioning position in response to variations in length of said portion of the strip, speed changing means for the motor, including a pair of electrically actuated control relays, and operable to effect a temporary change in motor speed by an amount dependent upon the length of time either of said relays is actuated, circuit controlling means for selectively energizing said relays comprising a pivoted contact member and stationary contacts positioned to be engaged selectively by said contact member through swinging movement thereof from a neutral position in opposite directions, an electrical torque motor having a shaft, a yieldable operating connection between said shaft and said contact member, to actuate the latter in either direction and permit continued turning movement of the shaft, electrical means responsive to displacement of said tensioning member from normal position to energize said torque motor and develop an operating torque for turning said shaft in a direction and to an extent dependent upon the direction and extent of displacement of said tensioning element, electromagnetic means actuated by the operation of either of said control relays to move said shaft in a counter direction in opposition to the operating torque, whereby to establish a leading relation for said shaft with respect to said tensioning element for effecting earlier contact opening as said control member is being returned to its neutral position, and a dash pot device operatively connected to said shaft and said control member, for actuating said control member independently of said yieldable operating means whenever a given rate of return movement for the tensioning element is exceeded.

9. In a strip tension control system for tandem rolling mills and the like, the combination of means for deflecting the strip to tension the same, electrical means for changing the speed of at least one mill motor, control means responsive to movement of said deflecting means out of a preselected tensioning position for initiating operation of said electrical means, said electrical means being operative at a predetermined uniform value during the period of operation thereof, and means responsive to the rate of movement of said deflecting means toward said normal position for rendering said electrical means inoperative independently of the position of said deflecting means.

10. In a strip tension control system for tandem rolling mills and the like, the combination of means for deflecting the strip to tension the same, electrical means for changing the speed of at least one mill motor, control means responsive to movement of said deflecting means out of a preselected tensioning position for initiating operation of said electrical means, said electrical means being operative at a predetermined uniform value during the period of operation thereof, and means controlled by operation of said electrical means for rendering said control means inoperative prior to full return of said deflecting means to said tensioning position, said last-named means being effective to render said control means inoperative only when said deflecting means reaches a given point in its return to said preselected tensioning position.

11. In a tension control system for tandem strip working apparatus including an electric driving motor, the combination with means for deflecting the strip to tension the same, of electrical means operable to change the speed of said motor at a predetermined uniform magnitude throughout the period of operation thereof, a movable contact member for controlling the operation of said electrical means, an operating member yieldably connected to said contact member for actuating the same, means responsive to movement of said deflecting means from a normal tensioning position for moving said operating member in one direction to an extent conformable with the extent of movement of said deflecting means, to actuate said contact member and initiate operation of said electrical means, and means controlled by operation of said electrical means for moving said operating member in the other direction in opposition to said first-named moving means into a leading relationship relative to said deflecting means, whereby said contact member is actuated to discontinue operation of said electrical means in advance of complete return of said deflecting means to said normal tensioning position.

12. In a tension control system for tandem strip working apparatus including an electric driving motor, the combination with means for reflecting the strip to tension the same, of electrical means operable to change the speed of said motor at a predetermined uniform magnitude throughout the period of operation thereof, a movable contact member for controlling the operation of said electrical means, an operating member yieldably connected to said contact member for actuating the same, means responsive to movement of said deflecting means from a normal tensioning position for moving said operating member in one direction to an extent conformable with the extent of movement of said deflecting means, to actuate said contact member and initiate operation of said electrical means, means controlled by operation of said electrical means for moving said operating member in the other direction in opposition to said first-named moving means into a leading relationship relative to said deflecting means, whereby said contact member is actuated to discontinue operation of said electrical means in advance of complete return of said deflecting means to said normal tensioning position, and means responsive to the rate of movement of said deflecting means toward said normal position for rendering said electrical means inoperative prior to the time said contact member is actuated as aforesaid to discontinue operation of said electrical means.

13. In a tension control system for strip rolling mills and the like having a driving motor associated therewith, the combination with means for deflecting the strip to tension the same and having a normal deflecting position, of electrical means operable to change the speed of said motor at a uniform predetermined rate throughout the period of operation thereof, means comprising a movable contact member and a fixed contact for controlling the operation of said electrical means, an operating member yieldably connected to said movable contact member for moving the same into and out of engagement with said fixed contact, means operatively connecting said deflecting means to said operating member to move the same in one direction with a variable operating force proportional to the extent of displacement of said deflecting means out of said normal deflecting position to effect closure of said contacts, electromagnetic means operatively associated with said operating member for imposing thereon a variable counterforce tending to move the same in the opposite direction, and means actuated by operation of said electrical means for energizing said electromagnetic means, said operating force decreasing as said deflecting means is moved toward normal position and said counterforce increasing relative thereto for effecting opening of said contacts while the deflecting means is still out of said normal position.

MATHIAS MICHEL.